(12) United States Patent
Tarlton

(10) Patent No.: US 6,349,814 B1
(45) Date of Patent: Feb. 26, 2002

(54) CARGO-TURNING CONVEYOR

(75) Inventor: Curtis S. Tarlton, Short Hills, NJ (US)

(73) Assignee: Nedco Conveyor Company, Union, NJ (US)

( * ) Notice: Subject to any disclaimer, the term of this patent is extended or adjusted under 35 U.S.C. 154(b) by 0 days.

(21) Appl. No.: 09/434,144

(22) Filed: Nov. 4, 1999

Related U.S. Application Data (60) Provisional application No. 60/107,100, filed on Nov. 4, 1998.

(51) Int. Cl.$^7$ .............................................. B65G 47/24
(52) U.S. Cl. ....................................... 198/407; 198/410
(58) Field of Search .............................. 198/405, 406, 198/407, 410, 417

(56) References Cited

U.S. PATENT DOCUMENTS

| | | | |
|---|---|---|---|
| 3,144,740 A | * 8/1964 | Erickson et al. | ......... 198/410 X |
| 3,767,028 A | * 10/1973 | Rosso | ......................... 198/405 |
| 3,933,236 A | * 1/1976 | Aterianus et al. | ....... 198/407 X |
| 4,411,350 A | * 10/1983 | Wolfram | .................. 198/417 X |
| 5,398,801 A | * 3/1995 | Langen et al. | .............. 198/407 |

* cited by examiner

*Primary Examiner*—James R. Bidwell
(74) *Attorney, Agent, or Firm*—Rohm & Monsanto, PLC (57) ABSTRACT

A conveyor arrangement that conveys cargo along a predetermined path of conveyance between an initial cargo intake portion and a final cargo releasing portion is provided with a first conveyor that is arranged to convey the cargo along a first portion of the predetermined path of conveyance between a first cargo receiving portion and a distal first cargo releasing portion of the first conveyor. The first conveyor has a twist that varies with respect to distance along a first intermediate cargo conveyance region. There is additionally provided a second twisted conveyor arranged to convey the cargo along a second portion of the predetermined path of conveyance. The second portion of the predetermined path of conveyance overlaps the first portion of the predetermined path of conveyance. A third twisted conveyor is arranged to convey the cargo along a third portion of the predetermined path of conveyance between a third cargo receiving portion and a third cargo releasing portion of the third conveyor. The third portion of the predetermined path of conveyance overlaps the second portion of the predetermined path of conveyance. The third cargo receiving portion has a predetermined third angular displacement that is responsive to the second angular displacement at the region along the second portion of the predetermined path of conveyance that corresponds to the location of the third cargo receiving portion. Thus, the cargo is rotated 180° during conveyance.

20 Claims, 5 Drawing Sheets

CARGO-TURNING CONVEYOR

CROSS-REFERENCE TO OTHER APPLICATION

This application claims the benefit of Provisional Patent Application Ser. No. 60/107,100 filed Nov. 4, 1998.

BACKGROUND OF THE INVENTION

1. Field of the Invention

This invention relates generally to conveyer systems, and more particularly, to a conveyor system that will rotate cargo thereon about an axis parallel to the direction of conveyance.

2. Description of the Related Art

In industries that employ conveyor systems, it is often desirable to rotate cargo or products in conveyance about an axis of rotation parallel to the direction of conveyance. It is desired that such rotation be effected gently so as not to subject the cargo to undue shock loads. It would be particularly advantageous in environments where the cargo is conveyed for a relatively long distance that such cargo rotation be effected without impeding the progress of the conveyance. Thus, for example, it would be desirable for the cargo to begin on the path of conveyance in a first orientation and to reach the end point of the conveyance, without stopping, but having been rotated by a predetermined angular rotation, illustratively 90° or 180°. Of course, increments of angular rotation less than 90° would be desirable.

It is, therefore, an object of this invention to provide a cargo conveyance arrangement that rotates the cargo or product thereon by a predetermined angular amount.

It is another object of this invention to provide a cargo conveyance arrangement that effects the rotation of the cargo without stopping or slowing down the conveyance.

It is also an object of this invention to provide a cargo-turning conveyance arrangement that readily can be integrated into existing conveyance systems.

It is a further object of this invention to provide a cargo turning conveyance arrangement that can operate continuously, without a predetermined cycle period.

SUMMARY OF THE INVENTION

A conveyor arrangement for conveying cargo along a predetermined path of conveyance between an initial cargo intake portion and a final cargo releasing portion, is provided with a first conveyor that is arranged to convey the cargo along a first portion of the predetermined path of conveyance between a first cargo receiving portion and a distal first cargo releasing portion of the first conveyor. The cargo receiving portion is arranged substantially horizontally to support the weight of the cargo directly thereon, and the first cargo releasing portion is arranged substantially vertically. The first conveyor has a twist in the form of a substantially continuous and increasing first angular displacement that varies with respect to distance along a first intermediate cargo conveyance region between the first cargo receiving portion and the first cargo releasing portion. There is additionally provided a second conveyor arranged to convey the cargo along a second portion of the predetermined path of conveyance between a second cargo receiving portion and a second cargo releasing portion of the second conveyor. The second portion of the predetermined path of conveyance overlaps the first portion of the predetermined path of conveyance, whereby the second cargo receiving portion is disposed in the first intermediate cargo conveyance region.

An optional third conveyor is arranged to convey the cargo along a third portion of the predetermined path of conveyance between a third cargo receiving portion and a third cargo releasing portion of the third conveyor. The third portion of the predetermined path of conveyance overlaps the second portion of the predetermined path of conveyance, whereby the third cargo receiving portion is disposed on the predetermined path of conveyance in the second intermediate cargo conveyance region. The third cargo receiving portion has a predetermined third angular displacement that is responsive to the second angular displacement at the region along the second portion of the predetermined path of conveyance that corresponds to the location of the third cargo receiving portion. Thus, the cargo is rotated 180° during conveyance.

In a further embodiment, the third conveyor has a substantially continuous and decreasing third angular displacement along a third intermediate cargo conveyance region between the third cargo receiving portion and the third cargo releasing portion. The third cargo releasing portion of the third conveyor is arranged substantially horizontally.

In accordance with a further apparatus aspect of the invention, there is provided a conveyor arrangement for conveying cargo along a predetermined path of conveyance between an initial cargo intake portion and a final cargo releasing portion. The conveyor arrangement is provided with a first conveyor arranged to convey the cargo along a first portion of the predetermined path of conveyance between a first cargo receiving portion and a distal first cargo releasing portion of the first conveyor. The cargo receiving portion is arranged substantially horizontally, and the first cargo releasing portion is arranged substantially vertically. The first conveyor has a substantially continuous and increasing first angular displacement along a first intermediate cargo conveyance region between the first cargo receiving portion and the first cargo releasing portion, whereby the cargo is first rotated about 45° as it is conveyed along the first portion of the predetermined path of conveyance. A second conveyor is arranged to convey the cargo along a second portion of the predetermined path of conveyance between a second cargo receiving portion and a second cargo releasing portion of the second conveyor. The second portion of the predetermined path of conveyance overlaps the first portion of the predetermined path of conveyance, whereby the second cargo receiving portion is disposed on the predetermined path of conveyance in the first intermediate cargo conveyance region. The second cargo receiving portion has a predetermined second angular displacement that is responsive to the first angular displacement at the region along the first portion of the predetermined path of conveyance that corresponds to the location of the second cargo receiving portion, whereby the cargo is second rotated about 90° as it is conveyed along the second portion of the predetermined path of conveyance. Additionally, there is provided a third conveyor arranged to convey the cargo along a third portion of the predetermined path of conveyance between a third cargo receiving portion and a third cargo releasing portion of the third conveyor. The third portion of the predetermined path of conveyance overlaps the second portion of the predetermined path of conveyance, whereby the third cargo receiving portion is disposed on the predetermined path of conveyance in the second intermediate cargo conveyance region. The third cargo receiving portion has a predetermined third angular displacement that is responsive to the second angular displacement at the region along the second portion of the predetermined path of conveyance that corresponds to the location of the third cargo receiving portion, whereby the cargo is third rotated about 45° as it is conveyed along the third portion of the predetermined path of conveyance.

In one embodiment of this further apparatus aspect of the invention, the third cargo releasing portion of the second conveyor is arranged substantially horizontally. Additionally, the predetermined second angular displacement of the second conveyor has a first substantially continuously varying angular displacement along a first portion of the second portion of the predetermined path of conveyance, and a second substantially continuously varying angular displacement along a second portion of the second portion of the predetermined path of conveyance. An intermediate region between the first and second portions of the second portion of the predetermined path of conveyance, that is substantially horizontal, is provided, the cargo having been rotated approximately 90° as it is conveyed along the intermediate region.

In a further embodiment, the first, second, and third conveyors are continuous conveyors that are each formed of a respective plurality of conveyor segments linked to one another, the conveyor segments traveling along conveyance and return paths of the first, second, and third conveyors. The first, second, and third conveyors are continuous conveyors may each be individually powered. In an advantageous embodiment, the conveyor segments are each engaged with a conveyance guide rail that extends along a respectively associated on of the first, second, and third portions of the predetermined path of conveyance. Each of the conveyor segments is engaged with a return guide rail that extends substantially parallel to a respectively associated on of the first, second, and third portions of the predetermined path of conveyance.

In accordance with a method aspect of the invention, there are provided the steps of:

first conveying the cargo along a first portion of a predetermined conveyance path on a first twisted conveyor, the cargo being rotated in response to its conveyance along a twist of the first twisted conveyor;

depositing the cargo onto a second twisted conveyor; and second conveying the cargo along a second portion of the on the second twisted conveyor, the cargo being further rotated in response to its conveyance along a twist of the second twisted conveyor.

In one embodiment of this method aspect of the invention, the first and second portions of the predetermined conveyance path overlap one another. The further rotation of the cargo in the step of second conveying results in a cumulative rotation of the cargo of about 90°.

In a further embodiment, there are further provided the further steps of:

further depositing the cargo onto a third twisted conveyor; and third conveying the cargo along a third portion of the predetermined conveyance path on the third twisted conveyor, the cargo being still further rotated in response to its conveyance along a twist of the third twisted conveyor.

The step of second conveying results in a cumulative rotation of the cargo of about 135°. However, the still further rotation of the cargo in the step of third conveying results in a cumulative rotation of the cargo of about 180°.

BRIEF DESCRIPTION OF THE DRAWING

Comprehension of the invention is facilitated by reading the following detailed description, in conjunction with the annexed drawing, in which.

DETAILED DESCRIPTION

Figure 1:
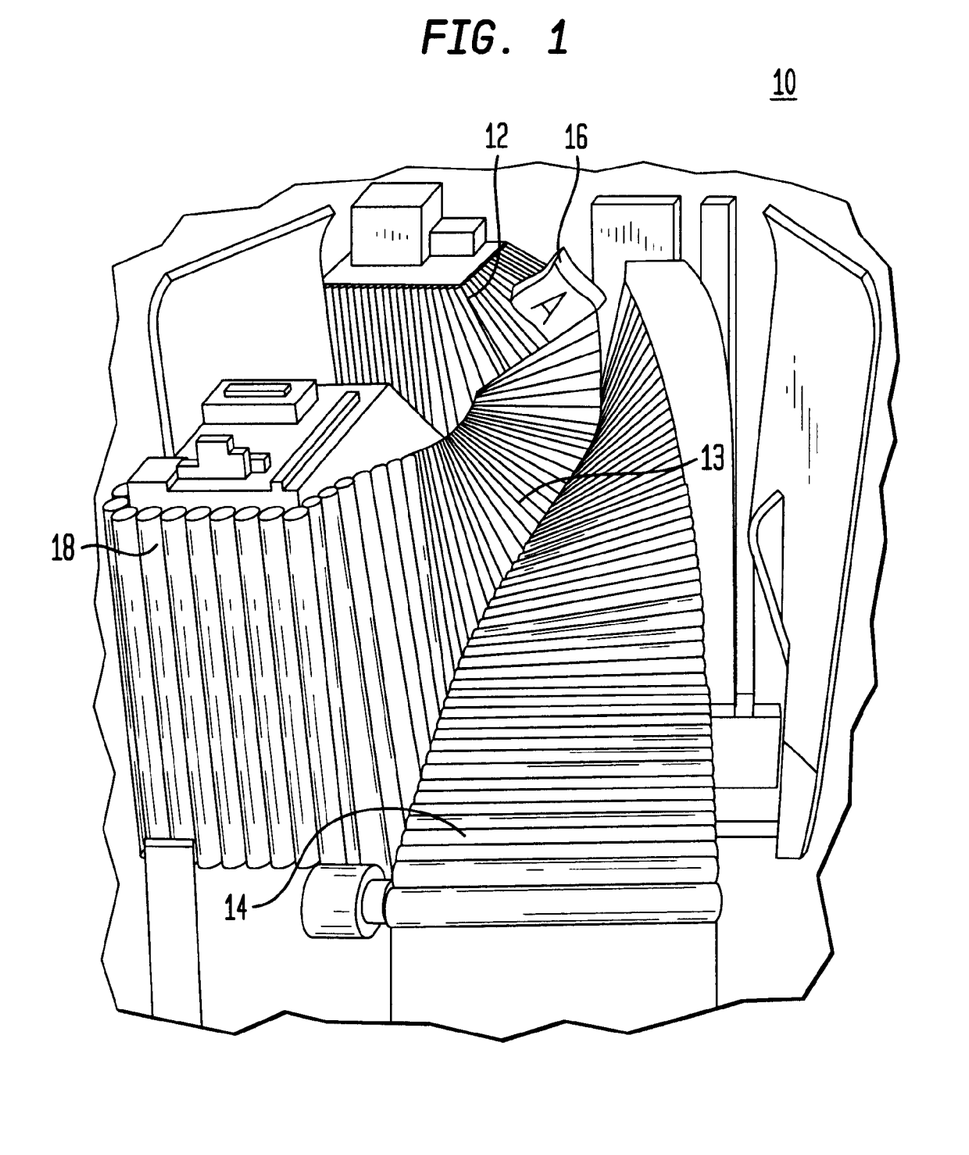
FIG. 1 is a perspective representation of an embodiment of the invention that rotates product conveyed thereon by an overall amount of 180°.

FIG. 1 is a perspective representation of a specific illustrative embodiment of the invention wherein there is provided a 180° conveyance system 10. Conveyance system 10 is formed of a first conveyor 12, a second conveyor 13, and a third conveyor 14. In this figure, conveyor 12 is furthest from the viewer, and conveyor 14 is nearest. As shown, each of the conveyors has a gradual twist formed therein, as will be described hereinbelow. In this embodiment of the invention, cargo is loaded at the distal-most portion of conveyor 12 (not shown), is delivered to conveyor 13 after undergoing a substantially 90° rotation, and then is conveyed to conveyor 14 wherein, as will be described hereinbelow with respect to FIG. 3, the cargo will have been rotated 180°.

As indicated, although not shown, conveyor 12 has an initial portion (not shown) on which a cargo box 16 is deposited. The initial portion may, in certain embodiments, be horizontal, as is the near portion of conveyor 14. Cargo box 16 is shown in transit along conveyor 12, toward the viewer, and therefore, has been partially rotated in a clockwise direction by virtue of the clockwise twist of conveyor 12. Cargo box 16 is shown to have a letter "A" printed thereon to facilitate understanding of its rotation in a clockwise direction as it progresses toward the view on conveyor system 10. In this specific illustrative embodiment of the invention, the receiving portion (not shown) of conveyor 12 is substantially horizontal, whereby the printed letter "A" was in normal, vertical position. In the position shown in FIG. 1, cargo box 16 has been rotated about 45° clockwise, and it is shown at this point to be supported by both conveyors 12 and 13. As such, therefore, cargo box 16 is about to be deposited onto conveyor 13.

The particular angle of conveyor 13 with respect to the horizontal is shown to vary with the corresponding angle of conveyor 12. In this embodiment, as the angle of conveyor 12 becomes steeper, the angle of conveyor 13 becomes shallower (i.e., closer to horizontal). A similar relationship exists between the varying angle of conveyor 13 and conveyor 14.

Conveyor 13 is, in this embodiment, an intermediate conveyor and is shown to have an initial portion that is slanted downward from right to left. This conveyor continues to twist until it constitutes a substantially horizontal middle section. This conveyor then continues to twist further until it is substantially vertical in the region of its turn-around 18. At turn-around 18, the surface belt of intermediate conveyor 13 is returned. It is to be noted that in some embodiments of the invention, the conveyance process can be terminated at the horizontal middle section of conveyor 13, resulting in a net rotation of the cargo of 90°. The present embodiment, however, provides a third conveyor (14) and is directed to effecting an overall cargo rotation of 180°, as described herein.

As stated, all of the conveyors are of the endless loop type. For example, conveyor 12 returns at conveyor return 20, in a manner similar to conveyor 13 at conveyor return 18.

Figure 2:
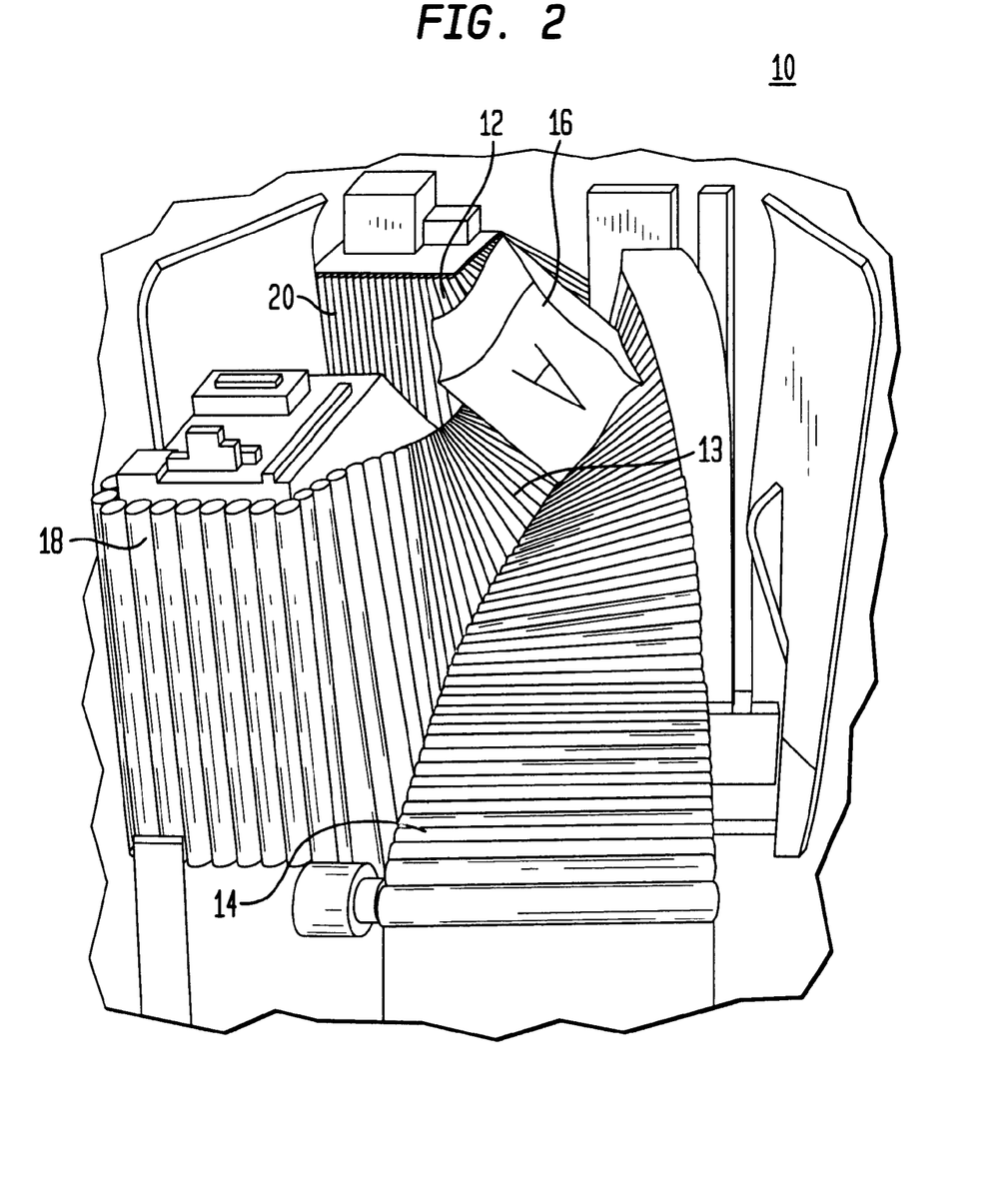
FIG. 2 is a perspective representation of the embodiment of FIG. 1 showing a cargo box in the process of being rotated between 90° and 180°.

FIG. 2 is a perspective representation of the embodiment of FIG. 1 showing cargo box 16 undergoing conveyance from conveyor 13 to conveyor 14. As can be seen from the letter "A" printed on cargo box 16, this cargo box has undergone a cumulative rotation greater than 90°. The conveyance of cargo box 16 along twisted conveyor 13 has resulted in a rotation of about 90°, in addition to the 45° of rotation experienced by the cargo box during conveyance on twisted conveyor 12. The original topside of cargo box 16 is now supported by conveyor 14 in a manner similar to the right hand side of cargo box 16 in FIG. 1 having been supported by the substantially vertical distal portion of conveyor 13 as it was in the process of being transferred form conveyor 12.

Figure 3:
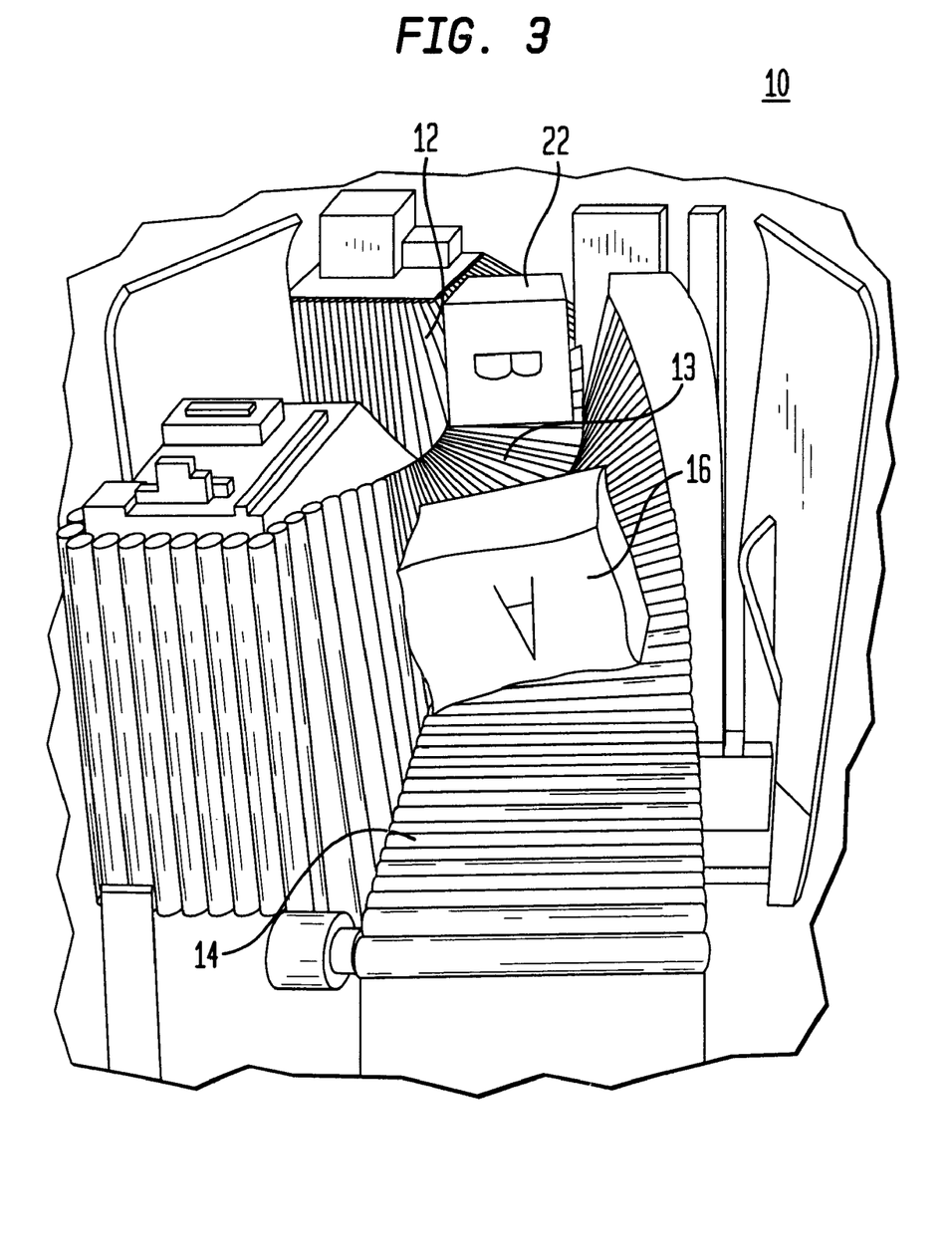
FIG. 3 is a perspective representation of the embodiment of FIG. 1 showing a cargo box that has been rotated 90°, and a further cargo box that has been rotated almost 180°.

FIG. 3 is a perspective representation of the embodiments of FIGS. 1 and 2, further showing cargo box 16 now having been rotate by approximately 180°. In addition, there is shown a further cargo box 22 with a letter "B" imprinted thereon. Cargo box 22 is shown to have been rotated by 90°, and in this figure, is supported by the substantially horizontal central region of the conveyor 13.

It is evident from FIG. 3 that conveyance system 10 is a continuous system in that a plurality of cargo boxes or other product can be conveyed thereon simultaneously, each being in a different state of the progression of rotation. Additionally, it is seen that cargo box 16 need not be precisely rectangular, as it is shown in the figure to have been deposited onto conveyance system 10 in a damaged condition. This condition, however, did not interfere with either the conveyance of the cargo box or the rotation thereof, as described hereinabove.

In addition to the foregoing, it is to be understood that the invention is not limited to the rotation of cargo container by 180°. Significant utility can be achieved in certain conveyance environments by turning cargo only 90°, as is the case with cargo box 22. More specifically, Cargo box 22 can be diverted to other conveyance equipment, or the conveyor system can be terminated (returned) in the vicinity of the central portion of conveyor 13. Of course, any amount of cargo rotation (i.e., not limited to 90° or 180° increments) can be achieved by the present invention.

Figure 4:
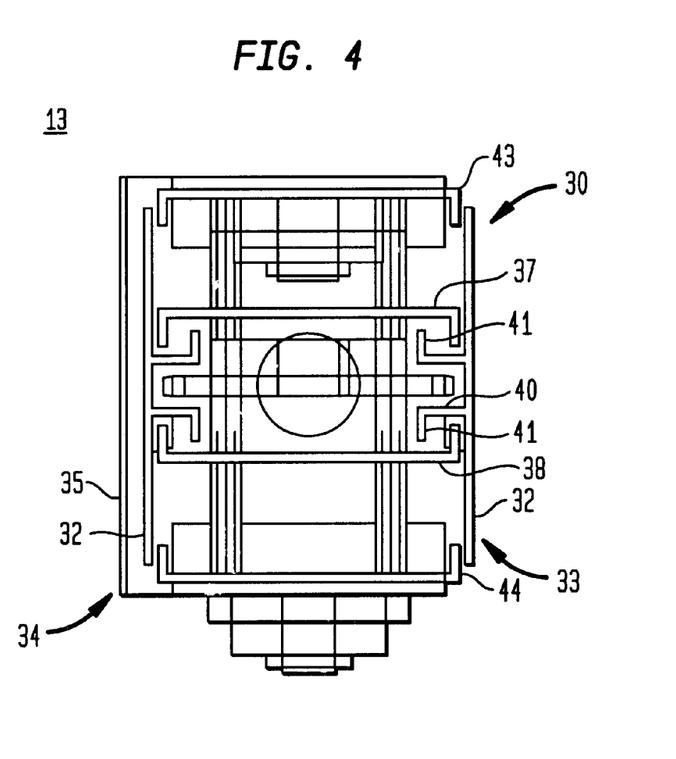
FIG. 4 is a simplified schematic representation of a vertical portion of a conveyor.

FIG. 4 is a simplified schematic representation of a region of a conveyor in the vicinity of a vertical turn-around, illustratively the vicinity of turn-around region 18 of conveyor 13. As shown, conveyor 13 is provided with a conveyor chain 30 which is formed of a plurality of serially interconnected conveyor links 32. For sake of consistency with respect to FIGS. 1–3, conveyor links 32 on right hand side 33 are traveling toward the viewer, and conveyor links 32 on left side 34 are traveling away from the viewer. In this embodiment of the invention, conveyance of cargo product is achieved by communication with conveyor links 32 while they are on right side 33, left side 34 being a return side protected by a plate 35.

Each of links 32 is coupled to a pair of guide rails 37 and 38 by operation of a coupling portion 40 that is fixed to each conveyor link 32, and extends inward between guide rails 37 and 38. In addition, coupling portion 40 has laterally extending portions 41 that engage behind the respective guide rails, thereby preventing disengagement between the conveyor links and the guide rails. The guide rails are supported at their lateral extremities by support rails 43 and 44.

Figure 5:
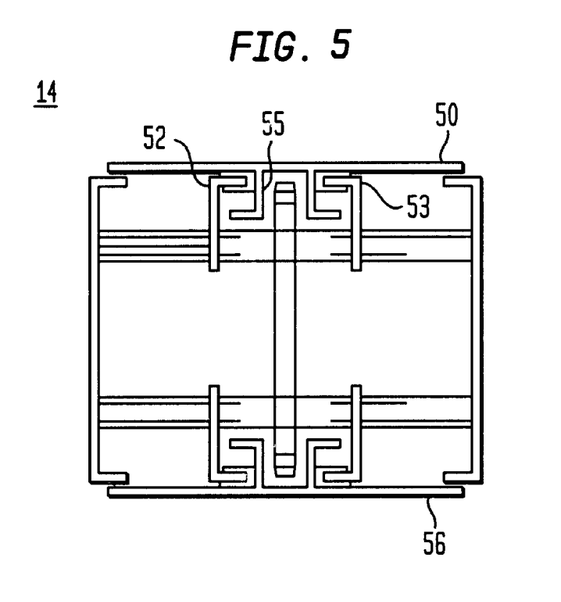
FIG. 5 is a simplified schematic representation of a horizontal portion of a conveyor.

FIG. 5 is a simplified schematic representation of a horizontal portion of a conveyor, such as the near portion of conveyor 14. Conveyor links 50 are engaged with respective ones of guide rails 52 and 53 by operation of respectively associated coupling portions 55 which function as described hereinabove with respect to FIG. 4. Conveyor link 50 supports the cargo product thereon during conveyance, and conveyor link 56, on the underside of conveyor 14, is returning, i.e., traveling into the plane of the figure.

Figure 6:
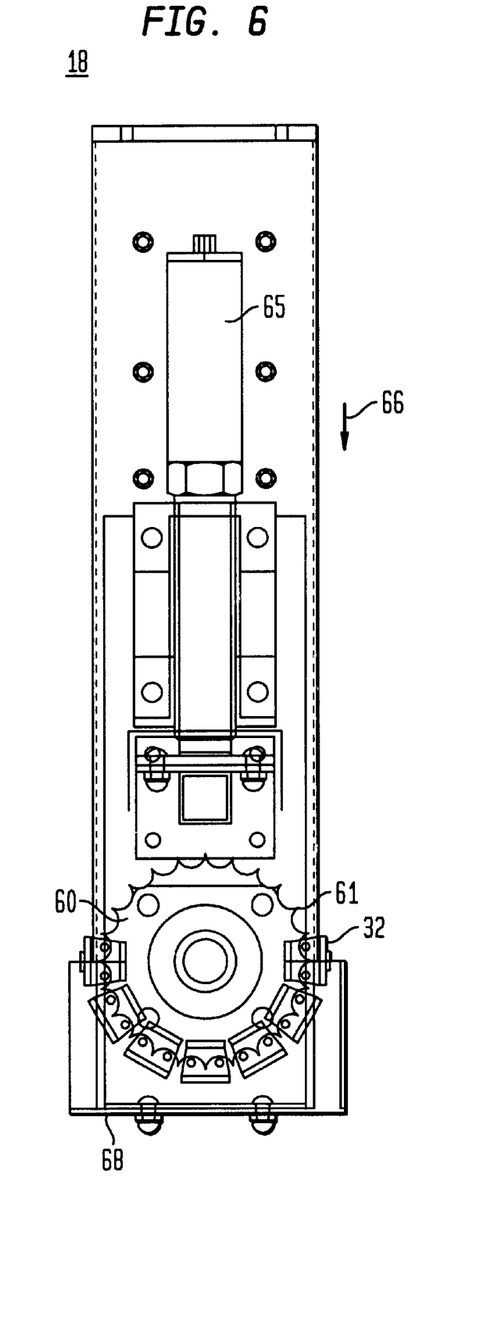
FIG. 6 is a schematic representation of a conveyor turn-around portion, viewed from the top.

FIG. 6 is a schematic representation of conveyor turn-around 18, viewed from the top. Conveyor links 32 engage with a sprocket 60 having a plurality of teeth 61 arranged therearound. For sake of simplicity of the drawing, the entire conveyor belt is not shown. Tension in the conveyor is maintained by operation of a cylinder/piston assembly 65. In one practical embodiment of the invention, cylinder piston assembly 65 has a 3" stroke in the direction of arrow 66. An end cover 68 is provided for safety.

In a practical embodiment of the invention, cylinder/piston assembly 65 is a pneumatic device, although other forms of cylinder/piston systems may be employed ion the practice of the invention.

Figure 7:
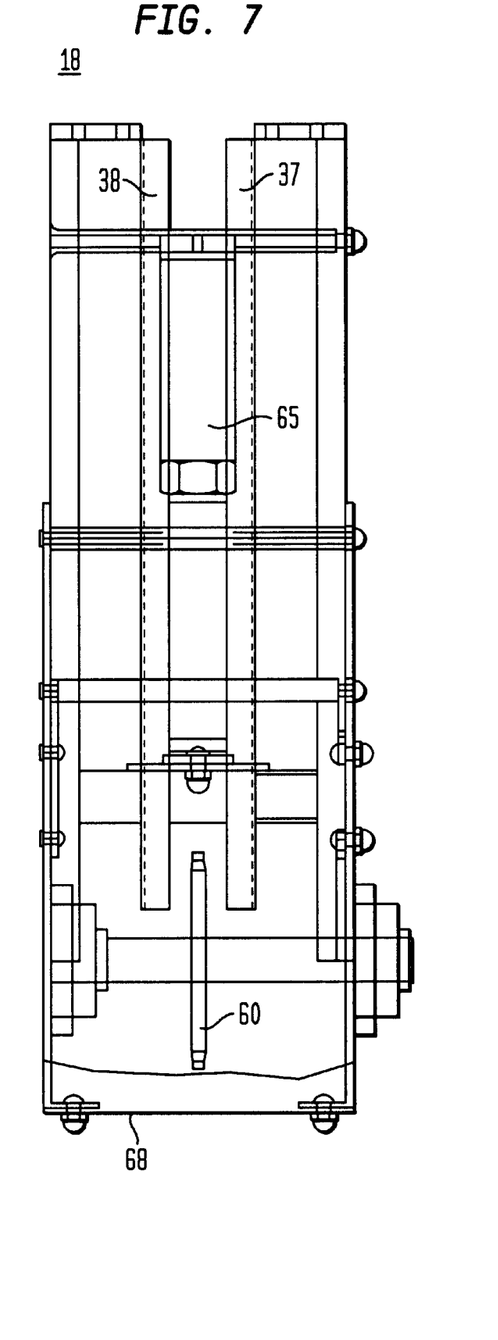
FIG. 7 is a simplified schematic representation of the turn-around portion as viewed form the side of FIG. 6.

FIG. 7 is a simplified schematic representation of turn-around portion 18 as viewed form the side of FIG. 6. Elements of structure that have previously been discussed are similarly designated. FIG. 7 shows guides rails 37 and 38 with which the respective conveyor links are engaged, as described hereinabove with respect to FIG. 4.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof

What is claimed is:

1. A conveyor arrangement for conveying cargo along a predetermined path of conveyance between an initial cargo intake portion and a final cargo releasing portion, the conveyor arrangement comprising:

a first powered conveyor formed of interconnected platform conveyor links and arranged to convey the cargo along a first portion of the predetermined path of conveyance between a first cargo receiving portion and a distal first cargo releasing portion of the first conveyor, the cargo receiving portion being arranged substantially horizontally, and the first cargo releasing portion being arranged substantially vertically, said first conveyor having a substantially continuous and increasing first angular displacement along a first intermediate cargo conveyance region between the first cargo receiving portion and the first cargo releasing portion; and a second powered conveyor formed of interconnected platform conveyor links and arranged to convey the cargo along a second portion of the predetermined path of conveyance between a second cargo receiving portion and a second cargo releasing portion of the second conveyor, the second portion of the predetermined path of conveyance overlapping the first portion of the predetermined path of conveyance, whereby the second cargo receiving portion is disposed on the predetermined path of conveyance in the first intermediate cargo conveyance region, the second cargo receiving portion having a predetermined second angular displacement that is responsive to the first angular displacement at the region along the first portion of the predetermined path of conveyance that corresponds to the location of the second cargo receiving portion.

2. The conveyor arrangement of claim 1, wherein said second conveyor has a substantially continuous and decreasing second angular displacement along a second intermediate cargo conveyance region between the second cargo receiving portion and the second cargo releasing portion.

3. The conveyor arrangement of claim 2, wherein the second cargo releasing portion of the second conveyor is arranged substantially horizontally.

4. The conveyor arrangement of claim 2, wherein there is further provided a third conveyor arranged to convey the cargo along a third portion of the predetermined path of conveyance between a third cargo receiving portion and a third cargo releasing portion of the third conveyor, the third portion of the predetermined path of conveyance overlapping the second portion of the predetermined path of conveyance, whereby the third cargo receiving portion is disposed on the predetermined path of conveyance in the second intermediate cargo conveyance region, the third cargo receiving portion having a predetermined third angular displacement that is responsive to the second angular displacement at the region along the second portion of the predetermined path of conveyance that corresponds to the location of the third cargo receiving portion.

5. The conveyor arrangement of claim 4, wherein said third conveyor has a substantially continuous and decreasing third angular displacement along a third intermediate cargo conveyance region between the third cargo receiving portion and the third cargo releasing portion.

6. The conveyor arrangement of claim 5, wherein the third cargo releasing portion of the third conveyor is arranged substantially horizontally.

7. A conveyor arrangement for conveying cargo along a predetermined path of conveyance between an initial cargo intake portion and a final cargo releasing portion, the conveyor arrangement comprising:

a first conveyor arranged to convey the cargo along a first portion of the predetermined path of conveyance between a first cargo receiving portion and a distal first cargo releasing portion of the first conveyor, the cargo receiving portion being arranged substantially horizontally, and the first cargo releasing portion being arranged substantially vertically, said first conveyor having a substantially continuous and increasing first angular displacement along a first intermediate cargo conveyance region between the first cargo receiving portion and the first cargo releasing portion, whereby the cargo is first rotated about 45° as it is conveyed along the first portion of the predetermined path of conveyance;

a second conveyor arranged to convey the cargo along a second portion of the predetermined path of conveyance between a second cargo receiving portion and a second cargo releasing portion of the second conveyor, the second portion of the predetermined path of conveyance overlapping the first portion of the predetermined path of conveyance, whereby the second cargo receiving portion is disposed on the predetermined path of conveyance in the first intermediate cargo conveyance region, the second cargo receiving portion having a predetermined second angular displacement that is responsive to the first angular displacement at the region along the first portion of the predetermined path of conveyance that corresponds to the location of the second cargo receiving portion, whereby the cargo is second rotated about 90° as it is conveyed along the second portion of the predetermined path of conveyance; and a third conveyor arranged to convey the cargo along a third portion of the predetermined path of conveyance between a third cargo receiving portion and a third cargo releasing portion of the third conveyor, the third portion of the predetermined path of conveyance overlapping the second portion of the predetermined path of conveyance, whereby the third cargo receiving portion is disposed on the predetermined path of conveyance in the second intermediate cargo conveyance region, the third cargo receiving portion having a predetermined third angular displacement that is responsive to the second angular displacement at the region along the second portion of the predetermined path of conveyance that corresponds to the location of the third cargo receiving portion, whereby the cargo is third rotated about 45' as it is conveyed along the third portion of the predetermined path of conveyance.

8. The conveyor arrangement of claim 7, wherein the third cargo releasing portion of the second conveyor is arranged substantially horizontally.

9. The conveyor arrangement of claim 7, wherein the predetermined second angular displacement of said second conveyor has a first substantially continuously varying angular displacement along a first portion of the second portion of the predetermined path of conveyance, and a second substantially continuously varying angular displacement along a second portion of the second portion of the predetermined path of conveyance.

10. The conveyor arrangement of claim 9, wherein there is provided an intermediate region between said first and second portions of the second portion of the predetermined path of conveyance, that is substantially horizontal, the cargo having been rotated approximately 90' as it is conveyed along the intermediate region.

11. The conveyor arrangement of claim 7, wherein said first, second, and third conveyors are continuous conveyors that are each formed of a respective plurality of conveyor segments linked to one another, said conveyor segments traveling along conveyance and return paths of said first, second, and third conveyors.

12. The conveyor arrangement of claim 11, wherein said first, second, and third conveyors are continuous conveyors that are each individually powered.

13. The conveyor arrangement of claim 11, wherein said conveyor segments are each engaged with a conveyance guide rail that extends along a respectively associated on of the first, second, and third portions of the predetermined path of conveyance.

14. The conveyor arrangement of claim 11, wherein said conveyor segments are each engaged with a return guide rail that extends substantially parallel to a respectively associated on of the first, second, and third portions of the predetermined path of conveyance.

15. A method of rotating cargo, the method comprising the steps of:

first conveying the cargo along a first portion of a predetermined conveyance path on a powered first twisted conveyor formed of a plurality of sequential platform conveyor links, the cargo being rotated in response to its conveyance along a twist of the first twisted conveyor;

depositing the cargo onto a second twisted conveyor; and second conveying the cargo along a second portion of the second twisted conveyor, the cargo being further rotated in response to its conveyance along a twist of the second twisted conveyor.

16. The method of claim 15, wherein the first and second portions of the predetermined conveyance path overlap one another.

17. The method of claim 15, wherein the further rotation of the cargo in said step of second conveying results in a cumulative rotation of the cargo of about 90°.

18. The method of claim 15, wherein there are further provided the steps of:

further depositing the cargo onto a third twisted conveyor; and third conveying the cargo along a third portion of the predetermined conveyance path on the third twisted conveyor, the cargo being still further rotated in response to its conveyance along a twist of the third twisted conveyor.

19. The method of claim 18, wherein the further rotation of the cargo in said step of second conveying results in a cumulative rotation of the cargo of about 135°.

20. The method of claim 19, wherein the still further rotation of the cargo in said step of third conveying results in a cumulative rotation of the cargo of about 180°.

* * * * *